Figure 1:
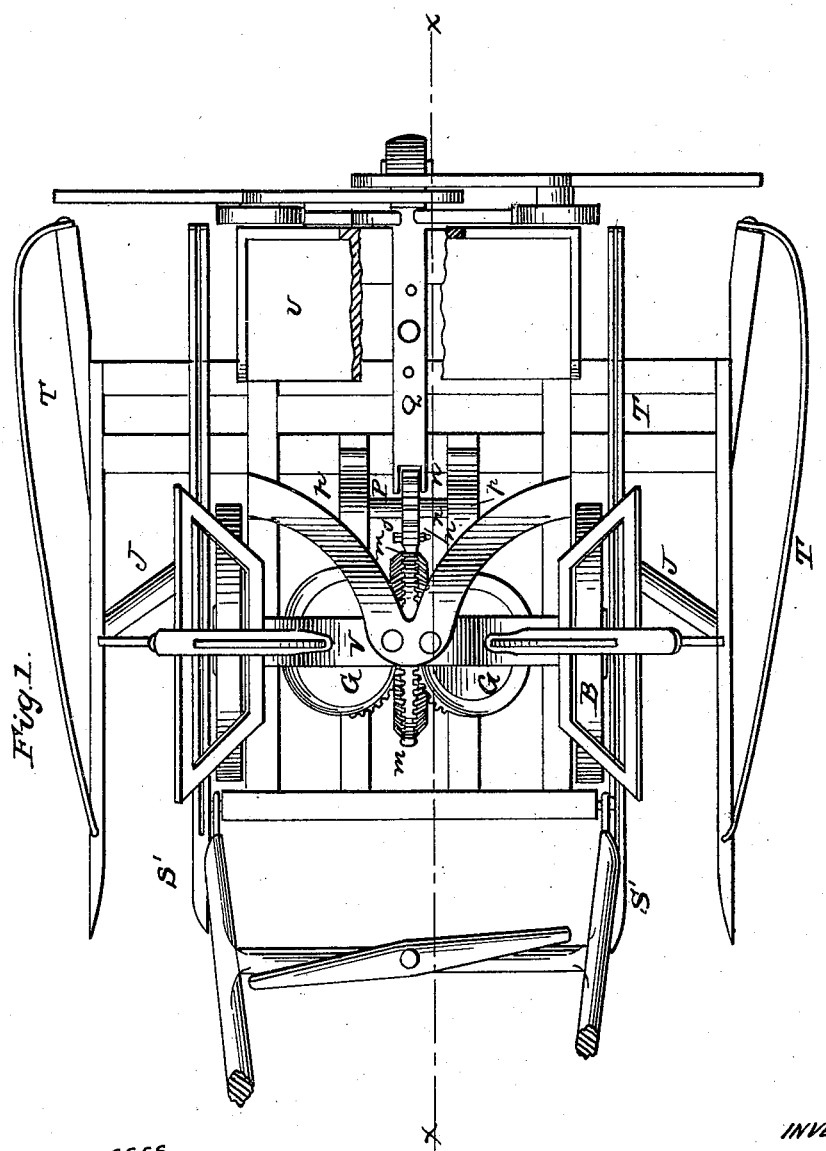

T. BUTTERWORTH.
Corn Harvester.

No. 52,384.

2 Sheets—Sheet 1.

Patented Feb. 6, 1866.

WITNESSES

INVENTOR

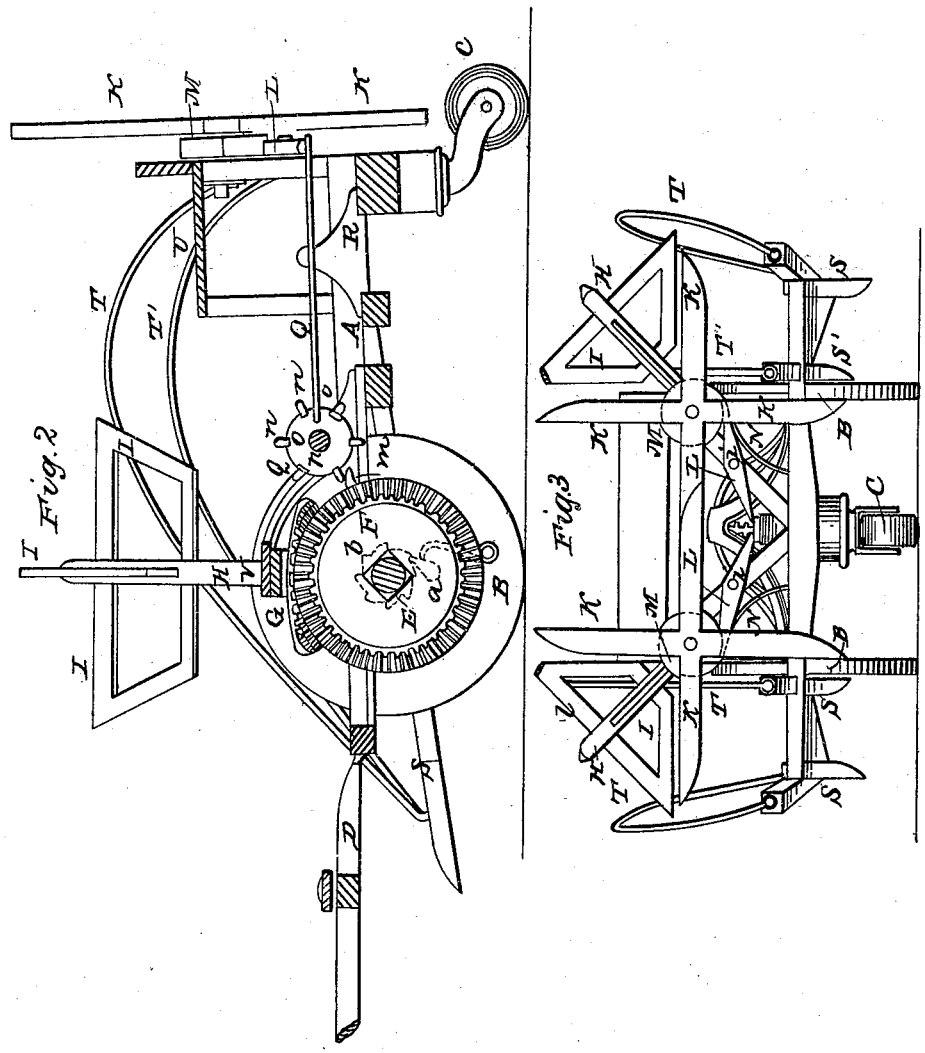

ature, construction, and operation of the same, sufficient to enable one skilled in the art to which it appertains to construct and use the same, reference being had to the accompanying drawings, in which—

UNITED STATES PATENT OFFICE.

T. BUTTERWORTH, OF SHELBYVILLE, MISSOURI.

IMPROVEMENT IN CORN-HARVESTERS.

Specification forming part of Letters Patent No. 52,384, dated February 6, 1866.

*To all whom it may concern:*

Be it known that I, T. BUTTERWORTH, of Shelbyville, in the county of Shelby and State of Missouri, have made new and useful Improvements in Corn-Harvesters; and I do hereby declare the following to be a full, clear, and exact description of the nature, construction, and operation of the same, sufficient to enable one skilled in the art to which it appertains to construct and use the same, reference being had to the accompanying drawings, in which—

Figure 1 is a plan or top view. Fig. 2 is a vertical and longitudinal section on the line *x x*, Fig. 1. Fig. 3 is a rear end elevation.

The improvement consists of a machine in which the horse walks between the rows of corn, which are cut by stationary knives on the machine, which come in contact with the corn as the machine progresses, the corn being drawn over toward the knives by revolving reels and received upon arms which are tripped when bunches of a sufficient size have accumulated, thereby dropping the bunches upon the ground.

The devices by which the reels are rotated and the catching-arms tripped will be detailed presently.

In the drawings, A is the frame, which is supported upon two wheels, B B, and the caster-wheel C, and drawn by means of the thills D. The wheels run loosely upon the axle E when rotating in a backward direction, but when going forward locking to the axle by means of spring-catches *a*, which engage with ratchets *b* on the axle E, so as to rotate the master-wheel F, whose bevel-cogs engage with those of the bevel-wheels G G, on whose shafts are the reels H H, whose arms I I gather the corn as the machine progresses, and hold it while the knives J J cut it, and then cause it to fall backward when it is caught upon the arms K of the catcher, which is temporarily prevented from rotating by means of the detaining catches or pawls L L, which are pivoted to the frame at *l*, engage with the ratchet-wheels M, and are kept in contact with the ratchet-teeth by means of the springs N N.

On the master-wheel F is one long cog or projecting tooth *m*, which engages with the teeth *n* of the wheel O, which revolves on a horizontal shaft, P, which is journaled in the blocks *p* on the frame A. This wheel O has a series of teeth on its periphery which are engaged by the teeth *m* of the master-wheel, and besides these it has projecting side teeth, *o o*, which, as they revolve, come above and depress as they pass it, the lever Q, which is pivoted on a bearer, R, and whose outer end actuates the pawl-triggers L L, so as to detach them from the ratchets M, so as to allow the catchers to make a quarter of a revolution and dropping the bunches of corn bring the next arms into the required position for catching the corn as it falls from the knives.

S S are the guards and gatherers, which, pointing outward slightly, gather in the corn which may lean over away from the machine, and by their downward projection insinuate themselves under leaning corn and conduct to the knives, the bows T T supporting the corn until, removed from the stubs, it falls upon the arms of the catcher. The inner guards, S' S', may be also provided with bows T' T' to prevent the corn from leaning inwardly, and to bring it in an upright position to the knives. The points of these inner guards, S' S', are slightly bent inward, and extend as far forward as those of the outer guards, S S.

The size of the bunches is regulated in a given stand of corn by means of increasing or decreasing the frequency with which the lever Q is tripped. This adjustment is attainable by means of increasing or decreasing the number of projections *n* on the wheel O, or the side projections *o o* on the wheel O, either of which modifications affect the frequency with which the lever Q is tripped, and consequently the periods at which the catchers are permitted to make the partial revolution which discharges their load.

The angular shape of the arms I agrees with the angularity of the knives, whose inner ends have a raking set back, while their edges range upward, so as to be presented in a favorable position to cut the corn.

U is the driver's seat, and V V the bridge-piece, in which the shaft H H of the reels is journaled.

Having described my invention, what I claim therein as new, and desire to secure by Letters Patent, is—

1. The combinaton of the obliquely-set knives with the reels revolving on the inclined shafts and provided with the angular arm, as described.

2. The combination of the master-wheel F, tooth *m*, toothed wheel O *n o*, lever Q, pawls L, and ratchet M, for tripping the catcher to discharge its load, as described.

3. The armed catcher K, in combination with the ratchet M, triggers L L, and lever or other equivalent tripping device for the intermittent dropping of the gathered corn.

T. BUTTERWORTH.

Witnesses:
 HENRY T. SHEETZ,
 JOHN DICKERSON.